United States Patent
Vitou

[15] 3,659,307
[45] May 2, 1972

[54] AUTOMOBILE HEADLIGHT CLEANING SYSTEM

[72] Inventor: Constantine K. Vitou, 2101 Graham Blvd. West, Montreal, 16 Quebec, Canada

[22] Filed: Aug. 22, 1969

[21] Appl. No.: 852,174

[30] Foreign Application Priority Data

July 22, 1969 Canada.....................................57,720

[52] U.S. Cl..........................15/250.01, 15/250.1, 15/250.22
[51] Int. Cl. ...........................................................A47l 1/00
[58] Field of Search ..............15/250.1, 250.01, 250.22, 250, 15/250.29, 250.30, 250.02

[56] References Cited

UNITED STATES PATENTS

| | | | |
|---|---|---|---|
| 1,196,081 | 8/1916 | Carence | 15/250.1 |
| 3,167,348 | 1/1965 | Hufenus | 15/250.10 |
| 3,456,278 | 7/1969 | Mandy | 15/250.02 |

Primary Examiner—Robert W. Jenkins
Attorney—Fetherstonhaugh & Co.

[57] ABSTRACT

An automobile headlamp cleaning system which comprises a continuous transparent shield which is mounted about the headlamp and substantially prevents dirt from contacting the headlamp. The transparent shield is cleaned automatically by rotating it about the headlamp and bringing it into contact with a spray of cleaning fluid and a brush.

11 Claims, 3 Drawing Figures

AUTOMOBILE HEADLIGHT CLEANING SYSTEM

This invention relates to motor vehicles and in particular to an automobile headlight cleaning system.

Present day automobiles are equipped with very efficient lights. These lights have been scientifically designed to project the maximum amount of light onto the surface of the road ahead of the vehicle without causing any glare in the eyes of the on-coming drivers. However, one of the very definite hazards of driving is that dirt accumulates on the headlights and unless they are periodically cleaned the loss of illumination can be extremely high. This serious problem of course is the subject of great concern and a number of attempts have been made to develop means of removing the dirt from headlights so as to reduce this cause of accidents.

The solutions which have been proposed appear to fall into two major categories. One typical solution is illustrated in U.S. Pat. No. 3,423,025 which issued on Jan. 21, 1969. This patent discloses a combination apparatus for cleaning both the windshield and the headlights and the specific device illustrated is a wide spray which directs the cleaning fluid over an area of either the windshield or the headlight. Such devices, of course, have some merit, however, they do run into difficulty with the very hard caked layer which frequently forms on the headlight and which a spray alone cannot remove.

Another solution to the problem is to incorporate an oscillating brush or rubber wiper much like a windshield wiper on the front surface of the headlight which when combined with a spray will remove most of the dirt and in some cases the hard caked dirt from the headlight lens. Such a device is illustrated in U.S. Pat. No. 3,058,142 which issued on Oct. 16, 1962. Such devices although they do offer a solution to the problem, have certain drawbacks. Oscillating brushes and wipers on the headlight lens of course are subject to a tremendous amount of abuse and are easily damaged. In addition, since they are mounted on the front of the lens they cannot help but reduce the amount of illumination coming from the lamps.

It is, therefore, an object of the present invention to provide an improved means for cleaning headlights which overcomes most of the disadvantages of the methods disclosed in the prior art.

Accordingly, there is provided an apparatus to substantially eliminate the dirt from an automobile head lamp lens comprising a continuous transparent shield mounted about said head lamp so as to substantially prevent dirt from coming into contact with said head lamp lens, said continuous transparent shield being adapted to move in front of said head lamp lens and means to remove the dirt from said continuous transparent shield.

The following is a description by way of example of certain embodiments of the present invention reference being had to the accompanying drawings in which.

Figure 1:
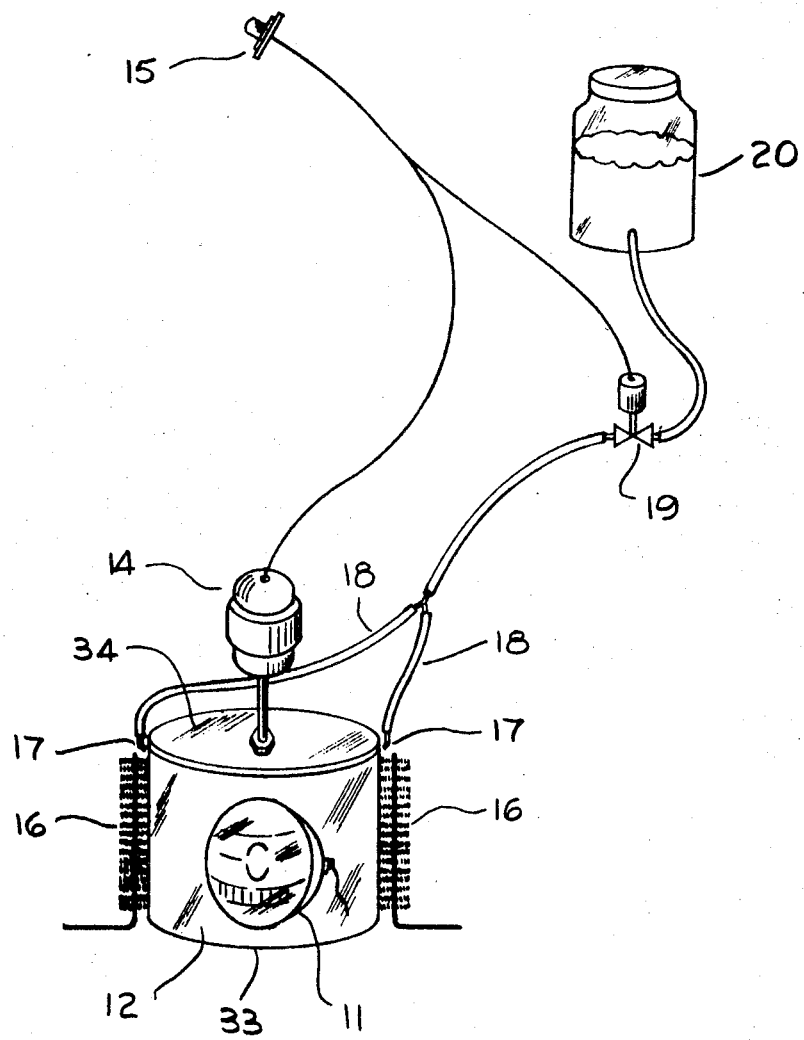
FIG. 1 is a schematic illustration of the headlight cleaning system.

Referring to FIG. 1, it will be seen that the head lamp 11 is mounted within a cylindrical transparent shield 12 which is so mounted as to be rotatable about its vertical axis. The power to rotate the cylindrical shield 12 is provided by motor 14 which is controlled in turn by pushbutton 15. As the cylindrical shield 12 is rotated, at least one and preferably two brushes 16 on either side of the assembly rub against the exterior surface. Jets of cleaning fluid emitting from the nozzles 17 of tube 18 wet the surface of the screen in the area of the brushes and assist in the cleaning action of the brushes. The flow of cleaning fluid is varied by solenoid valve 19 which is also controlled by the same pushbutton 15 as is the motor 14 driving the cylindrical screen. A reservoir 20 is provided for the cleaning fluid. This reservoir may be the same reservoir as is used for the cleaning fluid for the windshield washer or it may be an entirely independent system as desired.

To operate this mechanism the driver of the vehicle need only depress pushbutton 15. This opens the solenoid valve 19 permitting the cleaning fluid to flow from the reservoir 20 down through the tubing 18 to the nozzles 17 and spray on the surface of the cylindrical transparent shield surrounding the head lamp 11. At the same time the motor 14 is energized and causes the cylindrical shield 12 to rotate, thus bringing a clean section of the surface of the transparent cylindrical shield 12 into the area in front of the head lamp and at the same time cleaning the cylindrical shield by passing it in front of the cleaning brushes 16.

One of the novel features of the present invention is that it will operate even if there is no cleaning fluid. It is envisaged that just the cleaning action of the brushes alone will remove some of the dirt from the exterior surface of the cylindrical transparent shield. In addition, simply by jogging the pushbutton 15 the cylindrical shield can be moved slightly so as to bring a clean area of the shield into position in front of the head lamp.

Figure 2:
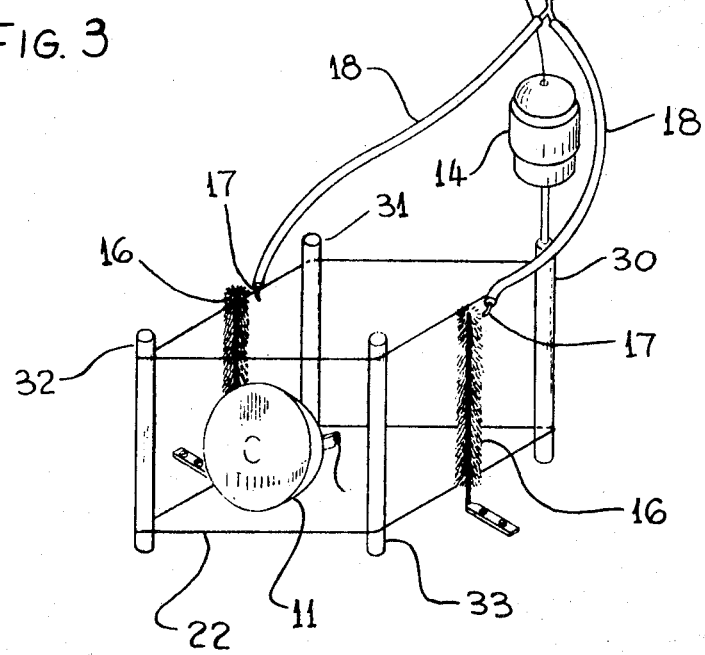
FIG. 2 is a schematic drawing of a second embodiment of the headlight cleaning system.

FIG. 2 illustrates a somewhat modified version of the head lamp cleaning system. In the first embodiment the cylindrical screen 12 would probably be of a fairly rigid material. In the embodiment illustrated in FIG. 2 the screen is formed of a flexible transparent material and is caused to rotate about a series of vertical rollers.

The operation of this apparatus is very similar to that illustrated in FIG. 1. The operator of the vehicle need only depress the pushbutton 15 in order to energize the motor 14 and open the solenoid valve 19 allowing cleaning fluid from the reservoir 20 to flow down through the tubes 18 to the nozzle 17 and spray on the transparent shield 22 just about at the spot at which this transparent shield comes into contact with the brushes 16. The motor 14 drives only one of the rollers 30 and the other rollers 31, 32 and 33 are idler rollers and rotate simply by their contact with the moving transparent flexible shield. The head lamp 11 located within the periphery of the transparent shield is mounted in much the same way as it would normally be in a vehicle except that passage must be allowed between the head lamp and the frame of the vehicle to permit the transparent shield to pass about the head lamp.

Figure 3:
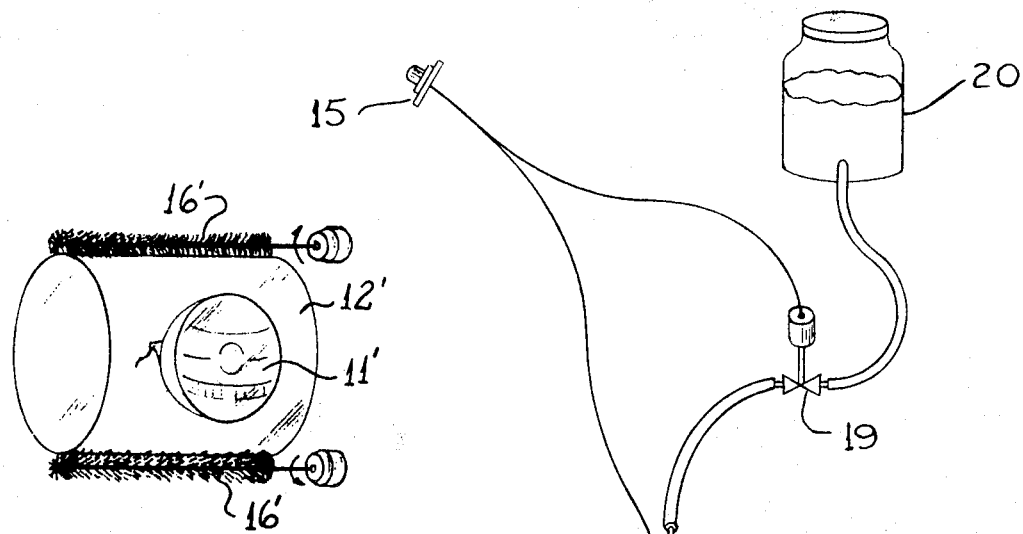
FIG. 3 is a schematic view of further embodiments of portions of the system of FIG. 1.

The brushes 16 which are used to clean the exterior of the transparent shield may be motor driven as shown in FIG. 3 to improve the cleaning action. These brushes 16 may be driven by the same motor which drives the transparent shield or a separate drive may be provided as shown.

The embodiment of the head lamp cleaning system illustrated in FIG. 1 lends itself to being sealed. This can be done by having a rubber seal about the bottom part of the cylindrical screen 12 which will prevent moisture and dirt from entering the inside of the cylindrical screen and prevent it from coming in contact with the head lamp lens. A top surface 34 can be built into this cylindrical screen thus completely sealing the head lamp from the exterior environment.

Since it would be more difficult to seal the head lamp cleaning system illustrated in FIG. 2, some access may be provided to permit the inside of the flexible transparent shield to be cleaned manually from time to time.

It is recognized that in either of the embodiments illustrated in FIGS. 1 and 2 the transparent shield 12 can be mounted to rotate about the vertical or the horizontal axis as shown in FIG. 3. One configuration will fit the frame of a specific automobile better than the others and it is believed that this will be the deciding factor as to which is used.

An important advantage of the present head lamp washer, aside from its ability to actually prevent dirt from coming into contact with the head lamp and removing the dirt from the area in front of the head lamp is that some small section of the cylindrical shield passing about the head lamp may be made of a different material. For example, it is envisaged as part of the present invention that an orange fog light material can be incorporated into part of the shield surrounding the head lamp. Thus by jogging the pushbutton 15 and bringing the cylindrical shield into a predetermined location the head lamps of the vehicle can be transformed from normal headlights into fog lights. A second advantage of this system is that by allowing the cylindrical shield to rotate continuously the head lamp would be changed from a continuous white light into an alternating yellow and white light. Such a lighting system could be used to advantage in emergencies.

It is believed that the head lamp washer of the present invention has many advantages and will greatly add to safety on our highways. This would be done primarily by improving the illuminating effect of the head lamps by removing the dirt from the surface ahead of the head lamp where it normally accumulates and secondly by offering various ways by which this cleaning effect can take place. The cleaning is accomplished in the normal manner by a combination of brush action and cleaning fluid, however, if for example, the cleaning fluid reservoir is empty some cleaning action can be obtained by simply rotating the transparent shield to cause it to rub against the brushes. Lastly, a clean section of the transparent shield can be moved into position in front of the head lamp by jogging the control button 15. This can be done three or four times before it becomes necessary to actually get out of the vehicle and manually clean the surface in front of the head lamp. Most drivers are reluctant to do this especially in bad weather and most especially when there is a great deal of traffic about since this can be a very dangerous procedure.

The second advantage of the present invention is the fact that it permits normal headlights to be transformed into fog lights or flashing emergency lights should this become necessary.

The embodiments of the invention in which an exclusive property or privilege is claimed are defined as follows:

1. An apparatus for substantially removing dirt from the light path of an automobile head lamp comprising, a head lamp stationarily positioned to direct light along a light path, a tubular, continuous transparent shield encircling the head lamp so as to substantially prevent dirt from coming into contact with the lens of the head lamp, one end of said tubular shield including means for receiving the head lamp mountings therethrough, means for moving the shield around the head lamp whereby different parts of the shield are successively placed in the light path of the head lamp, and a cleaning means for removing dirt from the exterior surface of said shield, said cleaning means comprising at least one brush positioned against the outside of the shield at a point out of the light path of a head lamp.

2. An apparatus according to claim 1, including a spray means for spraying a liquid onto the exterior surface of the shield in the vicinity of the brush.

3. An apparatus according to claim 1, said shield being of a flexible material.

4. The apparatus as claimed in claim 3 in which said continuous flexible shield is mounted so as to move in a path about a vertical axis.

5. The apparatus as claimed in claim 3 in which said continuous flexible shield is mounted so as to move in a path about a horizontal axis.

6. An apparatus according to claim 1, including a means for rotating said brush.

7. An apparatus as claimed in claim 1 in which said continuous transparent shield is a rigid cylinder.

8. An apparatus as claimed in claim 7 in which said cylinder is sealed at both ends.

9. An apparatus as claimed in claim 1 in which said transparent shield is mounted so as to rotate about a vertical axis.

10. An apparatus as claimed in claim 1 in which said transparent shield is mounted so as to rotate about a horizontal axis.

11. An apparatus as claimed in claim 1 in which part of said continuous shield is orange in color.

* * * * *